(12) United States Patent
Jacobson

(10) Patent No.: US 7,460,931 B2
(45) Date of Patent: Dec. 2, 2008

(54) METHOD AND SYSTEM FOR IMPROVING THE EFFICIENCY AND RELIABILITY OF A POWER GRID

(76) Inventor: Jay Jacobson, 20171 Eidelweiss St. NW., Oak Grove, MN (US) 55011

( * ) Notice: Subject to any disclaimer, the term of this patent is extended or adjusted under 35 U.S.C. 154(b) by 79 days.

(21) Appl. No.: 11/245,903

(22) Filed: Oct. 7, 2005

(65) Prior Publication Data

US 2007/0135972 A1    Jun. 14, 2007

(51) Int. Cl.
*G05D 11/00*    (2006.01)
(52) U.S. Cl. .......................... 700/295; 60/659
(58) Field of Classification Search ................. 700/295; 60/659
See application file for complete search history.

(56) References Cited

U.S. PATENT DOCUMENTS

| | | |
|---|---|---|
| 3,656,112 A | 4/1972 | Paull |
| 3,688,271 A | 8/1972 | Rouse |
| 3,705,385 A | 12/1972 | Batz |
| 3,729,727 A | 4/1973 | Young et al. |
| 3,742,142 A | 6/1973 | Martin |
| 3,754,250 A | 8/1973 | Bruner |
| 3,786,423 A | 1/1974 | Martell |
| 3,820,073 A | 6/1974 | Vercellotti et al. |
| 3,842,206 A | 10/1974 | Barsellotti et al. |
| 3,858,212 A | 12/1974 | Tompkins et al. |
| 3,914,757 A | 10/1975 | Finlay, Jr. et al. |
| 3,922,490 A | 11/1975 | Pettis |
| 3,944,723 A | 3/1976 | Fong |
| 3,967,264 A | 6/1976 | Whyte et al. |
| 4,004,097 A | 1/1977 | Spaulding |
| 4,035,772 A | 7/1977 | Abe et al. |
| 4,040,046 A | 8/1977 | Long et al. |
| 4,042,906 A | 8/1977 | Ezell |
| 4,075,607 A | 2/1978 | Abe |
| 4,119,948 A | 10/1978 | Ward et al. |

(Continued)

FOREIGN PATENT DOCUMENTS

JP    2003-087970    3/2003

OTHER PUBLICATIONS

P Sheaffer et al. "Universal Interconnection Technology Workshop Proceedings" Oct. 2002. pp. 1-74, A1-A84, B1, B2, C1, C2, D1.*

(Continued)

*Primary Examiner*—Albert DeCady
*Assistant Examiner*—Tejal Gami
(74) *Attorney, Agent, or Firm*—Patterson, Thuente, Skaar & Christensen, PA

(57) ABSTRACT

A method for enabling more widespread use of distributed generation, thereby improving the efficiency and reliability of the power grid and infusing energy conservation opportunities into the rental residential sector. The method may include steps of purchasing energy from an electrical energy provider at a first rate, delivering the purchased energy to separate dwelling units in a residential facility, and generating a first stream of arbitrage revenue by charging the responsible ratepayers for the delivered energy at a second rate generally higher than the first rate. A least a portion of the first stream of arbitrage revenue is used to provide a generator system including a generator and a transfer switch.

17 Claims, 2 Drawing Sheets

U.S. PATENT DOCUMENTS

| | | | |
|---|---|---|---|
| 4,135,101 A | 1/1979 | Young et al. | |
| 4,135,181 A | 1/1979 | Bogacki et al. | |
| 4,156,129 A | 5/1979 | Brugger et al. | |
| 4,166,975 A | 9/1979 | Germer et al. | |
| 4,213,119 A | 7/1980 | Ward et al. | |
| 4,241,237 A | 12/1980 | Paraskevakos et al. | |
| 4,254,472 A | 3/1981 | Juengel et al. | |
| 4,264,897 A | 4/1981 | Farnsworth | |
| 4,264,960 A | 4/1981 | Gurr | |
| 4,296,411 A | 10/1981 | Romanelli et al. | |
| 4,302,750 A | 11/1981 | Wadhwani et al. | |
| 4,315,251 A | 2/1982 | Robinson et al. | |
| 4,316,262 A | 2/1982 | Mizuta et al. | |
| 4,337,376 A | 6/1982 | Gruenberg | |
| 4,348,750 A | 9/1982 | Schwind | |
| 4,390,876 A | 6/1983 | Bjorklund et al. | |
| 4,394,540 A | 7/1983 | Willis et al. | |
| 4,396,915 A | 8/1983 | Farnsworth et al. | |
| 4,455,453 A | 6/1984 | Parasekvakos et al. | |
| 4,500,870 A | 2/1985 | Krohn et al. | |
| 4,510,398 A | 4/1985 | Culp et al. | |
| 4,510,756 A * | 4/1985 | Hise et al. | 60/659 |
| 4,549,274 A | 10/1985 | Lerner et al. | |
| 4,568,934 A | 2/1986 | Allgood | |
| 4,578,536 A | 3/1986 | Oliver et al. | |
| 4,589,075 A | 5/1986 | Buennagel | |
| 4,628,313 A | 12/1986 | Gombrich et al. | |
| 4,639,728 A | 1/1987 | Swanson | |
| 4,646,084 A | 2/1987 | Burrowes et al. | |
| 4,694,192 A | 9/1987 | Payne et al. | |
| 4,698,628 A | 10/1987 | Herkert et al. | |
| 4,707,852 A | 11/1987 | Jahr et al. | |
| 4,710,919 A | 12/1987 | Oliver et al. | |
| 4,713,837 A | 12/1987 | Gordon | |
| 4,724,435 A | 2/1988 | Moses et al. | |
| 4,731,547 A | 3/1988 | Alenduff et al. | |
| 4,803,632 A | 2/1989 | Frew et al. | |
| 4,804,938 A | 2/1989 | Rouse et al. | |
| 4,811,011 A | 3/1989 | Sollinger | |
| 4,817,131 A | 3/1989 | Thornborough et al. | |
| 4,829,540 A | 5/1989 | Waggener, Sr. et al. | |
| 4,833,618 A | 5/1989 | Verma et al. | |
| 4,864,589 A | 9/1989 | Endo | |
| 4,866,761 A | 9/1989 | Thornborough et al. | |
| 4,881,070 A | 11/1989 | Burrowes et al. | |
| 4,893,332 A | 1/1990 | Brown | |
| 4,912,552 A | 3/1990 | Allison, III et al. | |
| 4,998,024 A * | 3/1991 | Kirk et al. | 307/40 |
| 5,010,568 A | 4/1991 | Merriam et al. | |
| 5,025,470 A | 6/1991 | Thornborough et al. | |
| 5,032,833 A | 7/1991 | Laporte | |
| 5,038,140 A | 8/1991 | Ikeuchi | |
| 5,155,481 A | 10/1992 | Brennan, Jr. et al. | |
| 5,161,182 A | 11/1992 | Merriam et al. | |
| 5,197,095 A | 3/1993 | Bonnet et al. | |
| 5,200,987 A | 4/1993 | Gray | |
| 5,243,338 A | 9/1993 | Brennan, Jr. et al. | |
| 5,252,967 A | 10/1993 | Brennan et al. | |
| 5,262,966 A | 11/1993 | Shiihara | |
| 5,311,581 A | 5/1994 | Merriam et al. | |
| 5,381,136 A | 1/1995 | Powers et al. | |
| 5,383,134 A | 1/1995 | Wrzesinski | |
| 5,408,523 A | 4/1995 | McEachern et al. | |
| 5,410,590 A | 4/1995 | Blood et al. | |
| 5,430,430 A | 7/1995 | Gilbert | |
| 5,434,911 A | 7/1995 | Gray et al. | |
| 5,438,329 A | 8/1995 | Gastouniotis et al. | |
| 5,446,734 A | 8/1995 | Goldstein | |
| 5,448,230 A | 9/1995 | Schanker et al. | |
| 5,452,465 A | 9/1995 | Geller et al. | |
| 5,475,742 A | 12/1995 | Gilbert | |
| 5,475,867 A | 12/1995 | Blum | |
| 5,477,216 A | 12/1995 | Lee, Jr. et al. | |
| 5,481,259 A | 1/1996 | Bane | |
| 5,485,150 A | 1/1996 | Hisanaga et al. | |
| 5,490,134 A | 2/1996 | Fernandes et al. | |
| 5,493,287 A | 2/1996 | Bane | |
| 5,519,622 A | 5/1996 | Chasek | |
| 5,535,267 A | 7/1996 | Schull | |
| 5,541,589 A | 7/1996 | Delaney | |
| 5,559,894 A | 9/1996 | Lubliner et al. | |
| 5,576,700 A | 11/1996 | Davis et al. | |
| 5,581,229 A | 12/1996 | Hunt | |
| 5,583,493 A | 12/1996 | Lysen | |
| 5,590,179 A | 12/1996 | Shincovich et al. | |
| 5,594,431 A | 1/1997 | Sheppard et al. | |
| 5,602,744 A | 2/1997 | Meek et al. | |
| 5,617,084 A | 4/1997 | Sears | |
| 5,664,202 A | 9/1997 | Chen et al. | |
| 5,673,252 A | 9/1997 | Johnson et al. | |
| 5,696,501 A | 12/1997 | Ouellette et al. | |
| 5,767,790 A | 6/1998 | Jovellana | |
| 5,781,551 A | 7/1998 | Born | |
| 5,805,856 A * | 9/1998 | Hanson | 392/465 |
| 5,898,387 A | 4/1999 | Davis et al. | |
| 5,903,213 A | 5/1999 | Hodge et al. | |
| 5,918,380 A | 7/1999 | Schleich et al. | |
| 5,929,749 A | 7/1999 | Slonim et al. | |
| 5,995,601 A | 11/1999 | Garland et al. | |
| 6,014,089 A | 1/2000 | Tracy et al. | |
| 6,084,318 A | 7/2000 | Mardirossian | |
| 6,154,488 A | 11/2000 | Hunt | |
| 6,177,884 B1 | 1/2001 | Hunt et al. | |
| 6,181,985 B1 | 1/2001 | O'Donnell et al. | |
| 6,208,266 B1 | 3/2001 | Lyons et al. | |
| 6,226,600 B1 | 5/2001 | Rodenberg, III et al. | |
| 6,259,707 B1 | 7/2001 | Dara-Abrams et al. | |
| 6,333,975 B1 | 12/2001 | Brunn et al. | |
| 6,507,273 B1 | 1/2003 | Chang et al. | |
| 6,653,945 B2 | 11/2003 | Johnson et al. | |
| 6,785,592 B1 | 8/2004 | Smith et al. | |
| 6,868,293 B1 | 3/2005 | Schurr et al. | |
| 6,891,478 B2 | 5/2005 | Gardner | |
| 2003/0075982 A1* | 4/2003 | Seefeldt | 307/29 |
| 2003/0158677 A1* | 8/2003 | Swarztrauber et al. | 702/62 |
| 2005/0137813 A1* | 6/2005 | Swarztrauber et al. | 702/62 |
| 2006/0017324 A1 | 1/2006 | Pace et al. | |

OTHER PUBLICATIONS http://web.archive.org/web/20040814164142/http://www.nplains.com/energy/offpeak/index.html.*

* cited by examiner

METHOD AND SYSTEM FOR IMPROVING THE EFFICIENCY AND RELIABILITY OF A POWER GRID

FIELD OF THE INVENTION

This invention relates generally to methods for improving the efficiency and reliability of a power grid, and more specifically, to methods for improving the efficiency and reliability of a power grid with distributed generation and energy conservation.

BACKGROUND OF THE INVENTION

Worldwide demand for energy has recently begun to increase at an accelerating rate due to increased consumption by developing economies such as China, India, and the countries of Southeast Asia. This increased demand, primarily for fossil fuel energy, has resulted in pressures on energy delivery and supply systems, leading to sharply increased energy prices. These higher fossil fuel prices may, in turn, result in increased electricity prices to consumers due to the extensive use of fossil fuels in electrical generating plants.

Moreover, electrical generation and distribution systems within the United States have come under increasing pressure due to increased use of electricity and increased peak demand. Electric utilities have been forced to develop load management strategies to minimize supply disruptions during periods of high demand. These load management strategies have typically been in the form of selective load shedding or duty cycling of "interruptible" loads, primarily high-demand equipment in commercial and industrial facilities and air conditioning equipment.

Electric utilities have also employed distributed generation in some cases as a load management strategy to address peak demands. Typically, a generator capable of serving the entire facility load is installed at a high-demand commercial or industrial facility. The facility is then converted to "interruptible" power service from the electric utility. When peak system-wide demand is encountered, the electric utility may shed the facility load by interrupting the power service and starting the generator, which then serves the facility until system demand recedes and the facility can be again switched to utility power service. In some cases, the distributed generators have been connected so as to be capable of supplying power to the grid. In these cases, the electric utility may start the generator at its option in order to meet a peak load elsewhere and may purchase the power produced by the generator from the facility. This distributed generation, being generally close in proximity to the load, has the advantage of conserving energy by eliminating some of the transmission losses experienced due to the large distances between generating station and load in the typical power grid. Another advantage can be an improvement in reliability of the grid due to greater reserve capacity and flexibility.

The use of distributed generation, however, is generally limited by the capability of energy providers to make the required capital investment and to implement the logistics for maintaining distributed generators. Moreover, existing regulatory schemes limiting rates that may be charged to consumers by energy providers sometimes pose obstacles to timely recovery of the capital investment and ongoing expenses by the energy provider. Both of these factors have tended to discourage the widespread use of distributed generation.

As a result of the energy supply disruptions of the 1970s and 1980s, much progress has been made in the way of energy conservation in structures, particularly for electricity due to its generally higher cost. For example, commercial and industrial facilities have generally converted from incandescent to fluorescent lighting, have installed more efficient transformers and other equipment, and have installed more efficient HVAC equipment. These have delayed, but not prevented, the onset of the aforementioned infrastructure deficiencies.

One response to the energy supply disruptions of the early 1970's was to revise building construction codes to require separate electrical metering for individual apartments, as opposed to the previous practice of installing one master meter for an entire apartment building. It was thought that individual apartment residents would be provided with an economic incentive to conserve energy because they would then be required to pay their own electric bills. An unforeseen factor, however, is that apartment building owners, and not individual rental apartment dwellers, typically purchase the appliances, air conditioners, furnaces, and other significant electricity using devices for the apartment. Since the building owner no longer pays the electric bills, there is no incentive for the building owner to pay the higher first cost of higher efficiency devices. Although the individual apartment dweller has an incentive to conserve electricity to lower electric bill outlays, there is generally little that can actually be done due to the low efficiency appliances typically provided by the owner.

What is needed is a method of improving the efficiency and reliability of the power grid and infusing energy conservation opportunities into the rental residential sector by enabling more widespread use of distributed generation.

SUMMARY OF THE INVENTION

The present invention addresses the need of the industry by providing a method for enabling more widespread use of distributed generation, thereby improving the efficiency and reliability of the power grid and infusing energy conservation opportunities into the rental residential sector. According to an embodiment of the invention, the method includes steps of purchasing energy from an electrical energy provider at a first rate, delivering the purchased energy to separate dwelling units in a residential facility, and generating a first stream of arbitrage revenue by charging the responsible ratepayers for the delivered energy at a second rate generally higher than the first rate. A least a portion of the first stream of arbitrage revenue is used to provide a generator system including a generator and a transfer switch. The generator is operably connected to the residential facility and the power grid through the transfer switch so that the generator is selectively switchable among a first mode wherein the generator is uncoupled from the residential facility and the power grid, a second mode wherein the generator is coupled to the residential facility and is not coupled to the power grid, and a third mode wherein the generator is coupled to the power grid and the residential facility.

By switching the generator system to the third mode, a second stream of arbitrage revenue may be generated by charging the electrical energy provider for electrical energy provided to the power grid at a third rate generally higher than the first rate. At least a portion of this second stream of arbitrage revenue can then also be used to defray the cost of providing and operating the generator system.

In an embodiment of the invention, electrical energy usage and demand data for the individual dwelling units and the facility as a whole may be collected with monitoring equipment. This data may be used to determine a peak demand for the residential facility, thereby facilitating selection of a generator with sufficient capacity to serve the load while avoiding excessive oversizing, which may lower efficiency.

Other embodiments of the invention may include steps of identifying an energy conservation opportunity in the residential facility using the collected electrical energy usage and demand data. The amount of saved electrical energy associated with energy conservation opportunity may charged to the ratepayers at rate generally higher than the rate for the purchased energy, thereby generating a third stream of arbitrage revenue for defraying the cost of implementing the energy conservation opportunity, the generator system or both.

In a still further embodiment of the invention, the electrical energy provider may offer a financial incentive for replacing electrical devices with more efficient ones. In this embodiment, a fourth stream of arbitrage revenue may be generated by collecting the financial incentive from the electrical energy provider. This fourth stream of arbitrage revenue may also be used for defraying the cost of replacing the electrical devices, the generator system or both.

DETAILED DESCRIPTION OF THE PREFERRED EMBODIMENTS

According to the method of the present invention, a third party may provide a method of improving the efficiency and reliability of the power grid along with energy conservation opportunities with associated economic advantages for building residents and electric utilities. In particular, the method of the present invention is suited for providing distributed generating capacity in the power grid, thereby alleviating power grid infrastructure deficiencies and reducing transmission losses without requiring capital investment by a utility. Further the present invention may provide a method of infusing electrical energy related savings into rental residential structures, where there has heretofore been no effective and financially viable means to pursue energy conservation opportunities.

Figure 1:
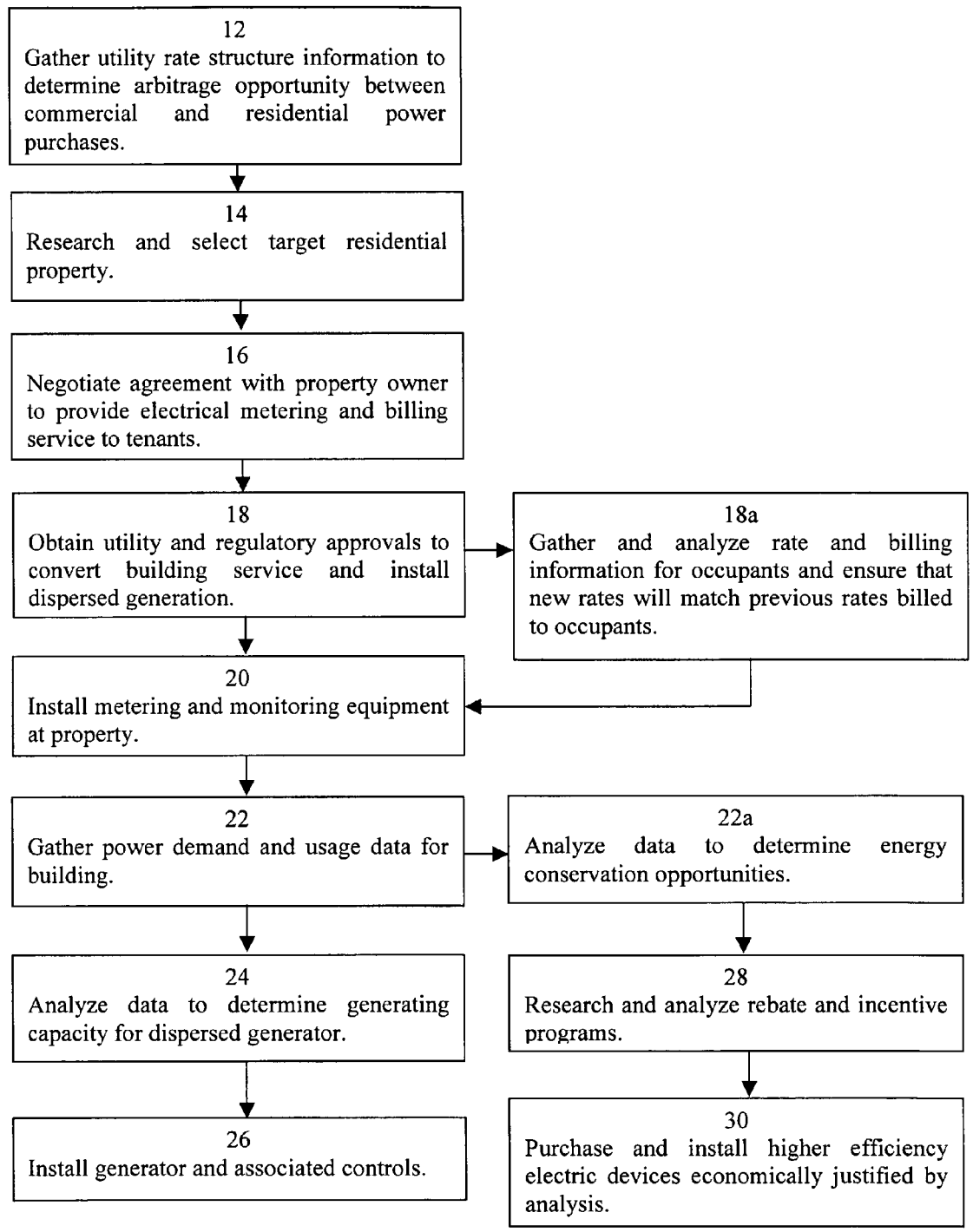
FIG. 1 is a diagram depicting an embodiment of the method of the present invention.

FIG. 1 is a diagrammatic depiction of an embodiment of the method 10 of the present invention. Typically, electric utility rate structures include different rates, depending on whether the power service is for commercial or residential purposes. In general, commercial rates will include a usage component and a demand component. The usage component typically involves a specified charge per unit of energy delivered (e.g. cents per kilowatt/hour). The demand component typically involves a specified charge per unit of power at the peak demand by the metered load during the billed time period (e.g. dollars per kilowatt demand). In contrast, residential rates generally include only a usage component. Residential usage rates, however, are generally significantly higher than corresponding commercial usage rates, due to the uninterruptability of residential loads, the generally lower volume of power purchased, and other factors.

In step 12, utility rate structures are researched and analyzed to determine the magnitude of any arbitrage opportunity in purchasing power from the utility at the commercial rate and billing the power at the residential rate to residential customers. The arbitrage opportunity should be of sufficient magnitude so as to enable purchase and installation of metering, monitoring, and distributed generation equipment for the proposed residential load with an acceptable period for simple payback of the capital investment. Generally, a simple payback period of three years or less is most desirable.

Once an acceptable arbitrage opportunity is established in a utility rate structure, target properties served by the utility are located and researched at step 14. Generally, high-density multi-tenant rental buildings such as large apartment houses are most desirably targeted, since these typically enable the lowest cost installation of metering and monitoring equipment, and are most easily served by a single, relatively large distributed generator. It is anticipated, however, that the method of the present invention is applicable to virtually any type and configuration of residential property, including low-density rental facilities such as townhouses, and even groups of detached single-family homes.

Legal ownership of the property resides with the building owner for residential property. As a result, it may be necessary to obtain approval from the building owner to assume control of the electrical service and billing for the building as depicted at step 16. Generally, an agreement can be negotiated wherein a set fee is paid to the owner for electrical service and billing access to the dwelling units.

In some instances, state regulatory authorities may have rules regulating re-metering or re-billing of electric power and distributed generation. Moreover, utilities may sometimes impose conditions under which the utility will buy and sell power. In these instances, negotiations may be entered with the regulatory agency or utility as depicted at step 18 to gain approvals and to establish the conditions under which the utility may provide power for re-billing and will buy power from distributed generation.

In an embodiment of the invention, it may be important to the overall success of implementing the method to ensure that the current occupants of the rental dwellings do not experience any increased cost. As depicted at step 18a, past billings to each of the individual dwelling units or occupants should be researched and analyzed to ascertain past billing levels. With this information, re-billed rates can be adjusted to match once metering and generation the equipment is in place and the re-metering system is operational.

When contemplating distributed generation to serve a particular facility or group of facilities, it is important that the generator selected is large enough to serve the maximum load that may be encountered. If the instantaneous demand exceeds generator capacity, damage or complete failure of the generator may occur. Moreover, if the generator is significantly oversized, the high first cost of the generator will lengthen the payback period and generator efficiency may be adversely affected.

Electrical usage at the dwelling unit and even individual demand level should he continuously monitored for a period of time to establish usage patterns and the maximum instantaneous demand that may be encountered as depicted at step 20. Electrical usage data is reported from transponders at the electric meter or device to a centrally located facility where the data is recorded and aggregated. The data collection and monitoring may be performed with any known equipment suitable for the purpose. Similarly, remote communication between the transponders and the central station can be accomplished with any known communications systems suitable for the purpose and over any suitable medium such as over the power conductors themselves, radio, or cellular telephone. Communication over the power conductors is currently most preferred due to the generally lower ongoing communication cost.

For the data to be suitably accurate, it is generally preferred that the reporting periods between each of the transponders and the central station be one minute or less. It is most preferred that the reporting period be 15 seconds or less. Once an accurate assessment of electrical usage and demand has been compiled, the data can be used to select the electrical generator for distributed generation as depicted in step 24. Generally, absent special circumstances, the generator should be about 20% larger than the highest instantaneous demand experienced during the monitoring period.

The selected generator and associated transfer switches may be installed as depicted in step 26. At a minimum, the generator should be equipped to automatically start and transfer load upon interruption of utility power. Most desirably, the generator should be arranged so as to be under the complete control of the utility, enabling it to be started, synchronized with the power grid, and brought on line for peak shaving at the option of the utility. Metering should be installed in such circumstances to enable billing of the utility for power delivered to the grid.

It will be appreciated that the generator system, monitoring equipment, and the operation and servicing thereof may be provided by a variety of means. For example, the equipment may be purchased outright by the third party using cash or other assets on hand or may be financed through a lender. Similarly, the operation and serving of the equipment may be performed by the third party, or may be contracted or outsourced to others. Alternatively, the equipment or portions thereof may be leased by the third party, or simply outsourced entirely with all equipment and services being provided by contract between the third party and the equipment owners and operators.

Figure 2:
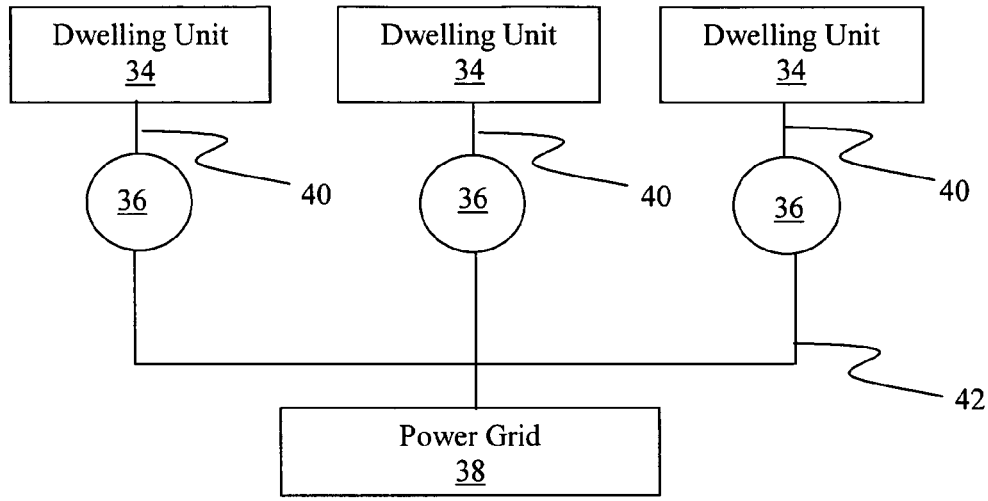
FIG. 2 is a diagram depicting an electrical service to a multi-dwelling residential facility before conversion using an embodiment of the method of the present invention.

The electrical service to a multi-dwelling residential facility 32 is depicted before conversion in FIG. 2. Each dwelling unit 34 in facility 32 has a separate electrical meter 36, through which it is served by electrical energy provider 38 through electrical distribution lines 40, 42. In operation, meters 36 are read by electrical energy provider 38, which then bills a ratepayer responsible for each unit 34 for the amount of energy metered by the meter 36 over the interval between readings.

Figure 3:
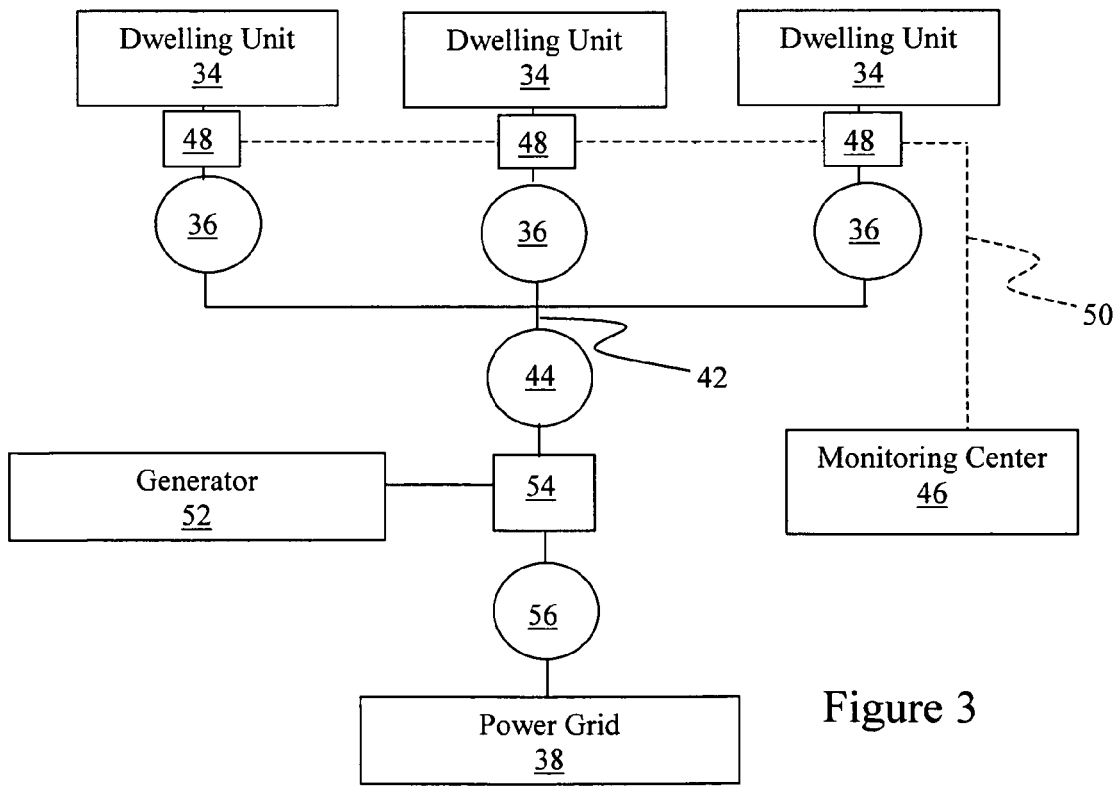
FIG. 3 is a diagram depicting an electrical service to a multi-dwelling residential facility after conversion using an embodiment of the method of the present invention

The electrical service to the multi-dwelling residential facility 32 is depicted after conversion according to an embodiment of the invention in FIG. 3. Master electric meter 44 is connected between electrical energy provider 38 and distribution lines 42 so that all electrical energy provided to meters 36 is metered by master meter 44. In operation, master meter 44 is read by electrical energy provider 38, which then bills the third party responsible for the power metered by the master meter. The third party in turn reads meters 36 and bills a ratepayer responsible for each unit 34 for the amount of energy metered by the meter 36 over the interval between readings.

In embodiments of the invention, separate monitoring transducers 48 may be installed for each unit 34 to monitor and record energy usage and demand in the unit. These monitoring transducers 48 may transmit energy usage and demand data to monitoring center 46 through communication means 50. Distributed generator 52 is selectively electrically connected with residential facility 32 and power grid 38 through transfer switch 54. Transfer switch 54 is desirably arranged so as to enable three modes of operation. In a first mode, generator 52 is disconnected from residential facility 32 and power grid 38 when it is not needed to provide energy. In a second mode, generator 52 is connected to residential facility 32 only, and is not connected with power grid 38. In this mode, the electrical load of residential facility 32 is shed from power grid 38. In a third mode, generator 52 is connected with both residential facility 32 and power grid 38 to enable sell-back of excess power generated by generator 52 to an electrical service provider connected through power grid 38. Electrical energy provided to power grid 38 for sell-back is metered by meter 56.

Once the generator has been installed and is operational, the power delivery from the utility may be converted from the individual residential services to delivery to the single master commercial meter, with re-metering and billing handled by the third party. The revenue stream generated by the arbitraged billings can then be collected by the third party and applied to defray the cost of providing, operating, and servicing the metering, monitoring, and generation equipment.

In an embodiment of the invention depicted in FIG. 3, the utility is provided with at least two options for managing peak loads. First, the entire residential building or complex can simply be disconnected from the grid if desired, with the load being served by the generator. This option has the effect of removing a large load from the grid at the peak load. Alternatively, the building or complex may remain connected to the grid with the generator being brought on line to supply power to the grid. This option may be advantageous when extra generating capacity is needed to serve loads elsewhere in the grid. The sell-back of electricity generated by the generator to the utility may generate a second stream of arbitrage revenue to the third party that may be used to defray the cost of providing, operating, and servicing the metering, monitoring, and generation equipment.

The usage and demand information collected at step 22 may also be used to evaluate energy conservation opportunities available in the structure or complex. For example, it may be determined from this data whether excessive amounts of power are being consumed by inefficient appliances or other devices in the dwellings or common areas. Further, opportunities for efficiency improvements through power factor correction may be discovered. These opportunities may be exploited to provide a third stream of arbitrage revenue to the third party.

The utility may have rebate programs for encouraging the purchase of high efficiency appliances, such as air conditioners, refrigerators, and the like. In these instances, the high efficiency appliances may be purchased by the third party with the rebate going to the third party to partially defray the cost of the new appliance. The ratepayer responsible for the dwelling unit in which the appliance is installed can be billed for the amount of energy that the previous appliance would have used so that the energy savings from the more efficient appliance goes to the third party until the investment in the appliance is repaid. Once repayment has been achieved, the savings may then either be retained by the third party or passed along to the ratepayers. Alternatively, the third party may simply wait for failure of individual appliances and replace them with higher efficiency appliances at that time. Any utility rebates may be collected as available.

In embodiments of the invention, all parties may achieve a benefit. The public at large and other property owners benefit from a more reliable, more efficient power grid due to the distributed generating capacity, which may eliminate blackouts and brownouts at peak loads, and transmission losses from long transmission lines. The utility benefits by reducing the load it must serve, thereby delaying, reducing, or even eliminating investment in generating capacity and infrastructure. The third party profits from the arbitrage revenue streams once any capital investments and expenses are paid. The owner of the apartment complex is relieved from responsibility for paying utility bills from tenants who have moved out and cannot be located. The occupants of the dwellings benefit from more newer, more efficient appliances.

What is claimed is:

1. A method for increasing efficiency and conserving energy in a power grid comprising steps of:
    selecting an electrical energy provider offering electrical energy for sale through the power grid at a plurality of rates including at least a first rate for residential service and a generally lower second rate for commercial service;
    selecting a residential facility being provided with electrical energy by the electrical energy provider, the residential facility including a plurality of separate dwelling units and having an electrical service wherein each dwelling unit has a separate electric meter for metering the electrical energy delivered to the unit, the metered electrical energy being charged by the electrical energy provider to a plurality of separate ratepayers at the first rate, each of the ratepayers associated with a separate one of the dwelling units;
    collecting electrical energy usage and demand data by monitoring electrical energy usage and demand for each separate dwelling unit;
    determining a peak demand for the residential facility using the collected electrical energy usage and demand data;
    altering the electrical service of the residential facility by installing a master electric meter for the residential facility while maintaining separate electric meters for each of the separate dwelling units, the master electric meter being connected so as to meter all electrical energy metered by the separate electric meters of the dwelling units, the electrical energy metered by the master electric meter being charged by the electrical energy provider to a third party at the second rate, generating a first stream of arbitrage revenue to the third party by charging the electrical energy metered by the separate electrical meters of the units to the plurality of separate ratepayers at a third rate higher than the second rate;
    using at least a portion of the first stream of arbitrage revenue to provide a generator system including a generator and a transfer switch, the generator having a peak capacity larger than the peak demand for the residential facility; and
    connecting the generator to the residential facility and the power grid through the transfer switch so that the transfer switch is selectively switchable to select among a first mode wherein the generator is uncoupled from the residential facility and the power grid, a second mode wherein the generator is coupled to the residential facility and is not coupled to the power grid, and a third mode wherein the generator is coupled to the power grid and the residential facility.

2. The method of claim 1, further comprising steps of generating a second stream of arbitrage revenue to the third party by switching the transfer switch to select the third mode, metering an amount of electrical energy provided to the power grid by the generator, and charging the electrical energy provider for the electrical energy provided to the power grid at a fourth rate, the fourth rate being generally higher than the second rate.

3. The method of claim 2, further comprising a step of using at least a portion of the second stream of arbitrage revenue to provide the generator system.

4. The method of claim 2, further comprising steps of identifying an energy conservation opportunity in the residential facility using the collected electrical energy usage and demand data, the energy conservation opportunity having an amount of saved electrical energy associated therewith, implementing the identified energy conservation opportunity, and generating a third stream of arbitrage revenue to the third party by charging the amount of saved electrical energy to the plurality of separate ratepayers at a fourth rate generally higher than the second rate.

5. The method of claim 4, wherein the energy conservation opportunity comprises replacing at least one electrical device in the residential facility with another electrical device having a higher energy efficiency than the replaced electrical device.

6. The method of claim 5, wherein the electrical energy provider offers a financial incentive for replacing the at least one electrical device in the residential facility, and wherein the method further comprises steps of generating a fourth stream of arbitrage revenue to the third party by collecting the financial incentive from the electrical energy provider.

7. The method of claim 1, wherein the step of collecting electrical energy usage and demand data includes steps of installing monitoring equipment in each dwelling unit and transmitting the data to a remote location.

8. The method of claim 1, wherein the step of collecting electrical energy usage and demand data includes steps of monitoring peak demand for each dwelling unit at predetermined time intervals.

9. The method of claim 8, wherein the time intervals are one minute or less.

10. The method of claim 8, wherein the time intervals are 15 seconds or less.

11. The method of claim 1, wherein the third rate is generally equivalent to the first rate.

12. A method for increasing efficiency and conserving energy in a power grid using distributed generation in a residential facility including a plurality of separate dwelling units, each unit having a ratepayer associated therewith, the method comprising steps of:
    purchasing energy from an electrical energy provider at a first rate;
    delivering the purchased energy to the separate dwelling units through a master meter connected so as to meter all energy purchased at the first rate, and through a plurality of separate individual dwelling unit meters, each of the individual dwelling unit meters connected so as to meter all energy delivered to a separate one of the plurality of dwelling units;
    generating a first stream of arbitrage revenue by charging the ratepayers for the delivered energy at a second rate generally higher than the first rate;
    using at least a portion of the first stream of arbitrage revenue to provide a generator system including a generator and a transfer switch;
    connecting the generator to the residential facility and the power grid through the transfer switch so that the transfer switch is selectively switchable to select among a first mode wherein the generator is uncoupled from the residential facility and the power grid, a second mode wherein the generator is coupled to the residential facility and is not coupled to the power grid, and a third mode wherein the generator is coupled to the power grid and the residential facility;
    collecting electrical energy usage and demand data by monitoring electrical energy usage and demand for each separate dwelling unit, and determining a peak demand for the residential facility using the collected electrical energy usage and demand data; and identifying an energy conservation opportunity in the residential facility using the collected electrical energy usage and demand data, the energy conservation opportunity having an amount of saved electrical energy associated therewith, implementing the identified energy conservation opportunity, and generating a third stream of arbitrage revenue by charging the amount of saved electrical energy to the ratepayers at a fourth rate generally higher than the first rate.

13. The method of claim 12, further comprising steps of generating a second stream of arbitrage revenue by switching the transfer switch to the third mode, metering an amount of electrical energy provided to the power grid by the generator, and charging the electrical energy provider for the electrical energy provided to the power grid at a third rate generally higher than the first rate.

14. The method of claim 13, further comprising a step of using at least a portion of the second stream of arbitrage revenue to provide the generator system.

15. The method of claim 12, including a step of using the peak demand to select the generator.

16. The method of claim 12, wherein the third rate is generally equivalent to the second rate.

17. The method of claim 12, wherein the fourth rate is generally equivalent to the second rate.

* * * * *